United States Patent
Chakrabarty et al.

(10) Patent No.: US 8,832,608 B1
(45) Date of Patent: Sep. 9, 2014

(54) RETIMING-BASED DESIGN FLOW FOR DELAY RECOVERY ON INTER-DIE PATHS IN 3D ICS

(71) Applicant: Duke University, Durham, NC (US)

(72) Inventors: Krishnendu Chakrabarty, Chapel Hill, NC (US); Brandon Noia, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 13/919,022

(22) Filed: Jun. 17, 2013

(51) Int. Cl.
*G06F 17/50* (2006.01)

(52) U.S. Cl.
CPC .................................. *G06F 17/5031* (2013.01)
USPC ............................................... 716/51; 716/55

(58) Field of Classification Search
CPC .......................... G06F 17/5031; G06F 17/5022
USPC .......................................................... 716/108
See application file for complete search history.

(56) References Cited

U.S. PATENT DOCUMENTS

| | | | |
|---|---|---|---|
| 8,754,533 B2* | 6/2014 | Or-Bach et al. | 257/777 |
| 2011/0093827 A1* | 4/2011 | Tsurusaki et al. | 716/113 |
| 2012/0193806 A1* | 8/2012 | Or-Bach et al. | 257/774 |

* cited by examiner

*Primary Examiner* — Suresh Memula
(74) *Attorney, Agent, or Firm* — Saliwanchik, Lloyd & Eisenschenk, P.A.

(57) ABSTRACT

A three dimensional (3D) stacked integrated circuit (IC) design-for-Testing (DfT) die-level wrapper boundary register having a bypass mode and design-level DfT delay recovery techniques are provided. Die wrappers that contain boundary registers at the interface between dies can be inserted into 3D ICs where the boundary registers include a gated scan flop with a bypass line passing the functional input to a through-silicon-via (TSV) in a manner avoiding the clocked stages of the gated scan flop during functional operation. A retiming process can be applied during design layout using a simulation/routing tool or standalone program to recover the additional delay added to the TSV paths by the DfT insertion. Retiming can be performed at both die and stack level, and in further embodiments, logic redistribution across adjacent dies of the stack can be performed for further delay optimization.

20 Claims, 8 Drawing Sheets

Algorithm 1 LogicRedis($DieA, DieB, CritPathA, cellLibrary$)

$cellToMove = \text{getCell}(DieA, CritPathA);$
$fanIn = \text{getFanIn}(DieA, cellToMove, cellLibrary);$
$controlSig = \text{getControlSignal}(cellToMove, cellLibrary);$
if $fanIn$ OR $controlSig$ then
   return $\{DieA, DieB\};$
else
   $\{DieA, DieB\} = \text{moveLogic}(DieA, DieB, CritPathA);$
end if
return $\{DieA, DieB\};$

FIG. 8

RETIMING-BASED DESIGN FLOW FOR DELAY RECOVERY ON INTER-DIE PATHS IN 3D ICS

This invention was made with government support under Federal Grant No. CCF-1017391 awarded by the National Science Foundation. The government has certain rights in the invention.

BACKGROUND

As circuit geometries continue to scale toward smaller feature sizes, interconnect delay has become a significant contributor to circuit latency. In order to reduce power consumption and increase bandwidth (and facilitate higher clock rates), three-dimensional (3D) integration utilizing die stacking with vertical through-silicon via (TSV) interconnects is being advocated. These 3D circuits replace long horizontal interconnects with shorter vertical TSVs in order to reduce latency. In this manner critical circuit paths can be partitioned across two or more dies in a stack, replacing traditional high-delay 2D interconnects with low-delay TSV vertical interconnects.

As part of the fabrication process, 3D ICs are tested before bonding (pre-bond) and after bonding (post-bond) to ensure stack yield. Pre-bond testing is performed to ensure that only known good die (KGD) are bonded together to form a stack. Post-bond testing is performed to ensure the functionality of the complete stack and screen for defects introduced in alignment and bonding.

To perform KGD testing, design-for-testability (DfT) features, such as boundary registers, built-in-self-test (BIST) architectures, or other methods may be used. Often, these DfT features include elements located on functional paths, including paths with TSVs. Although the elements on the functional paths are used to facilitate KGD determination, this placement creates an increased load and delay, which can have a negative impact on functional timing, or latency, for inter-die paths.

BRIEF SUMMARY

Techniques and systems for reducing functional timing impact of design-for-testability features are described. According to certain embodiments, a retiming-based design flow for 3D ICs is provided, where an automated delay recovery can be applied after synthesis and DfT insertion.

A DfT of one embodiment involves a die wrapper that contains boundary registers at the interface between dies. The boundary registers can include a gated scan flop (GSF) with a bypass mode. The bypass mode enables a functional signal to avoid the two clocked stages of the gated scan flop during operation. During the layout process of an IC (before, during and/or after physical layout), retiming can be applied to automate a layout that can recover the additional delay added to through-silicon via (TSV) paths by the DfT insertion.

The retiming can be performed at both the die and stack level. In some embodiments, logic redistribution of complex gates is performed during die-level retiming to further improve latency. During retiming, the location of die wrapper boundary flops is fixed to remain at the logic/TSV interface. When applying retiming at the stack-level, this condition prevents the boundary flops from being moved off chip to an adjacent one. In some cases, it may be desirable to perform retiming some dies of the stack and not others. In one of such cases, "dummy" registers may be included during retiming to enable stack-level retiming while inhibiting changes to the dies selected for no retiming.

Additional test architectures, for example test-access-mechanisms or scan chains, may be added after retiming is complete. In a further embodiment, retiming may be applied after scan insertion (for a first or additional time).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4A-4D illustrate a method of delay recovery (including logic decomposition) for a DfT in a 3D IC applied at a die-level.

FIGS. 6A-6D illustrate a process flow for logic redistribution according to an embodiment.

DETAILED DISCLOSURE

Certain embodiments are directed to systems and techniques for implementing built-in test elements in 3D ICs. Both the logic elements and the connections (e.g., TSVs) of a chip can be tested to ensure that a 3D IC or other stacked arrangement can operate appropriately. One of the advantages of 3D stacked ICs is the reduction in interconnect delay gained by utilizing short TSVs in place of long 2D interconnects. For example, in a memory-on-logic stack, latency on the TSV path directly impacts memory access time. In logic-on-logic stacks, least-slack paths are split between die layers to increase operating frequency. In 3D circuits, especially logic-on-logic stacks, some improvements of 3D integration, including latency, may be most apparent when critical paths are split between two or more dies.

The use of TSVs instead of long 2D interconnects increases the slack of critical paths and therefore allows for a faster functional clock. However, die-level test elements can affect the slack of critical paths of 3D stacked ICs.

Latency refers to the amount of time it takes for a signal to get from one designated point to another, and is often a measure of time delay in an expected or desired response time.

Slack refers to the amount of delay that can be added to a path without alterning the timing of the overall circuit.

Pre-bond and post-bond testing of IC chips can be carried out using the built-in DfT elements. These DfT elements are included in the IC design as part of the chip design process and balance the need to test the components of the chip with the overhead of cost, chip area, and signal delay during normal chip operations when included as part of the IC chip.

During the design process, a register-transfer level (RTL) model is generated to for an integrated circuit. The RTL model may be written in a hardware description language (HDL) such as VHDL and Verilog. RTL is synthesized into gate level descriptions and can be used by placement and routing tools to create a physical layout that takes into consideration routing, power, placement, clocking, and various design rules for a technology node. Some aspects of the layout may be automated; other aspects may be a matter of design choice which would then be verified using rules.

Generally, DfT features are inserted into a layout from a netlist, before physical layout of the circuit.

One DfT approach for pre-bond and post-bond testing of logic elements and TSVs can include die-level wrappers. These die wrappers include die-level test elements at the interface between die logic and TSVs to add controllability and observability at the TSV. An example die-level test element is a die-level wrapper boundary register (WBR), which may be implemented as a gated scan flop (GSF). WBRs include scan flops inserted at the die interface between the next die in the stack (or the primary inputs and outputs in the case of the lowest die in the stack) and the die's internal logic.

By using a gated scan flop design along with a controller that enables individual TSVs for testing, boundary scan cells of die-level wrappers can be used for pre-bond testing of TSVs.

The use of GSFs as boundary registers provide pre-bond fault coverage. The GSF design enables pre-bond probing of TSVs directly without the need for oversized probe pads by shorting TSVs together through a single probe needle to form a TSV network. GSFs allow for the selective driving of TSVs in a network to perform pre-bond TSV test and selective loading/unloading of scan chain I/O to perform pre-bond scan test.

Once the ICs are bonded, the boundary registers contribute to latency overhead in the signal paths that cross die boundaries. In particular, in a 3D circuit, these registers will be located on critical paths because they will exist on every path that utilizes a TSV or has to interface with a TSV on another die.

Figure 1:
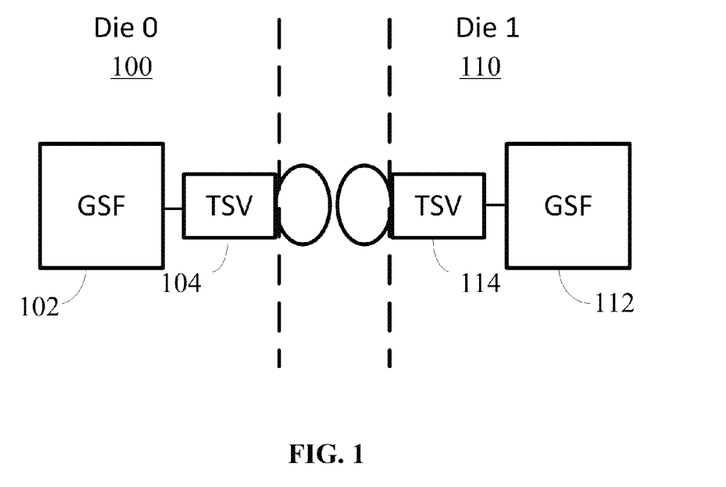
FIG. 1 shows a representation of a die stack illustrating boundary registers at both sides of a TSV.

For example, once multiple chips having the boundary flops are stacked, such as shown in FIG. 1, the two TSVs with corresponding boundary scan register adds two additional clocked stages to a functional path, which would otherwise not exist in a two-dimensional (2D) design. In detail, a first die (Die 0) 100 having a GSF 102 in the TSV 104 path and a second die (Die 1) 110 having a GSF 112 in the TSV 114 path create two clocked stages, GSF 102 and GSF 112 in the functional signal path between the two dies.

According to an embodiment, a gated scan flop bypass path is introduced to minimize delay by avoiding clocking stages through the gated scan flop during certain operations.

Figure 2:
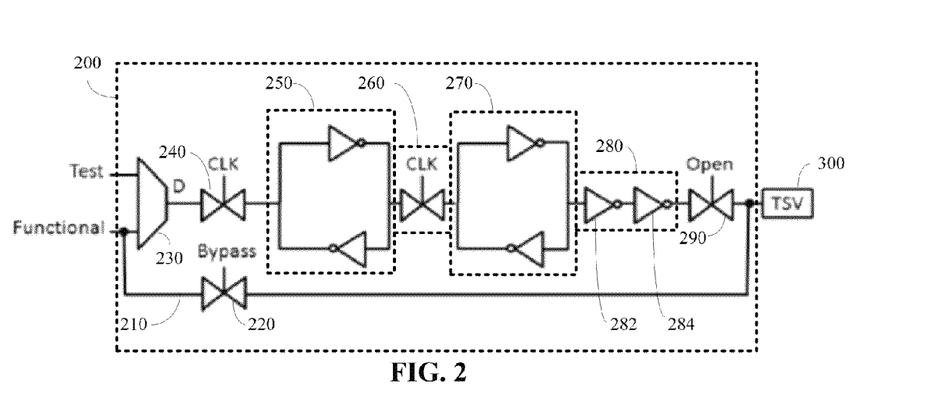
FIG. 2 shows an example gate-level design of a gated scan flop with a bypass path according to an embodiment.

A DfT feature of some implementations includes a die wrapper configuration in which a gated scan flop with bypass path is used as a boundary scan register. FIG. 2 shows an example gate-level design of a gated scan flop 200 with a bypass path 210 according to an embodiment. The bypass path 210 of the GSF 200 can pass the functional signal via a transmission gate 220 controlled by a Bypass signal. In functional mode, the Bypass signal is asserted (turned on) to route the functional input directly to the TSV, circumventing the need for latching functional data in the boundary registers.

The GSF can include a multiplexer (MUX) 230 (test enable control signal not shown) receiving Test and Functional inputs to output a selected one as input "D," which is passed via a first transmission gate 240 controlled by the clock CLK to a first delay latch 250. The signal is then passed via a second transmission gate 260 also controlled by the clock CLK to a second delay latch 270. The delay latches 250, 270 can be in the form of cross-coupled inverters for storing the data.

A gated scan flop (GSF) multiplexes between a test and functional input similar to a boundary scan register and can be connected to other GSFs to form a scan chain. A difference between a GSF and a typical boundary scan register is that the GSFs include a buffer 280 of two inverters (282, 284) and a transmission gate 290 at the output of the flop (formed, for example of the two delay latches 250, 270), which accepts an 'open' signal to switch between a low- and a high-impedance output. In accordance with embodiments of the invention, a gated output is used to control whether the output to the TSV 300 floats or takes the value stored in the flop. This design effectively allows the TSV 300 to be driven by the GSF or to be left floating. GSFs on receiving TSVs, or those TSVs that would be driven by another die in the stack, are bidirectional in that the GSF can drive the TSV during test.

The output buffer(s) 280 provided before the signal is output to the TSV 200 can be configured such that the gated scan flop can drive a large capacitance on its output net without altering the value held in the flop. The output buffer(s) 280 and third transmission gate 290 may alternatively be replaced with a tri-state buffer where the Open signal is provided at the control input.

Bypass paths can be added to the boundary scan cells to multiplex the functional input between being latched in the flop or being output directly to/from the TSV. During functional mode, the bypass path is active and a signal traveling across dies is not latched in the boundary register; however, the bypass path still introduces additional path latency.

Certain embodiments can reduce or eliminate the additional timing overhead on inter-die paths caused by DfT inserted at the TSV interface. In one embodiment, retiming can be utilized after the insertion of DfT elements (e.g. boundary registers or BIST) that impact timing for inter-die paths. During retiming, on-die slack is redistributed to reduce for DfT delay by performing register move operations that preserve circuit function.

Through retiming, slack can be redistributed throughout a circuit in such a way that cross-die critical paths can meet their pre-wrapper-insertion timing requirements.

In some implementations, two-dimensional retiming methods can be reused after test-insertion by fixing the location of die wrapper boundary flops so that they remain at the logic/TSV interface during retiming.

Register retiming is a post-synthesis, algorithmic approach to circuit optimization that has shown success in reducing power consumption and enhancing testability. Most retiming algorithms focus on clock-period reduction. During retiming, slack is moved from paths with excess slack to least-slack paths without altering the function of the circuit by moving the location of registers in relation to combinational logic. Transforms are defined to limit how and where registers can be moved by retiming algorithms to preserve circuit functionality. According to various embodiments of the invention, boundary registers are restricted from movement away from a TSV.

In the simplest algorithms, retiming is performed by representing a circuit as a directed graph where vertices represent logic gates and edges represent connections between logic elements. The weight of each edge represents the number of registers present between two logic elements. The propagation delay through each vertex is calculated as a function of the number of logic elements through a directed path that does not contain a register. During retiming, registers can be moved between graph edges to reduce the delay values for graph paths.

According to an embodiment, retiming is performed after synthesis and test-architecture insertion in a 3D stack to recover the additional delay added to a TSV path by boundary registers. The methods can be applied at die-level or at stack level.

For certain die-level implementations, a delay recovery automation may receive as input the netlist of a synthesized RTL of a 3D IC, a cell library, and any selections of dies to undergo die-level delay recovery. With these inputs, the delay recovery automation can perform a computer implemented method including 1) determining a timing target by identifying an amount of slack on a least-slack path of the selected die and incrementally reducing a target clock period until the least-slack path has no positive slack; 2) inserting a boundary register for a wrapper between a logic block and a through-silicon-via (TSV); 3) performing a retiming process that considers the boundary register as a fixed register so that the boundary register is not moved and logic or another register is not moved between the boundary register and the TSV; 4) performing a timing analysis to determine if the timing target is satisfied or not satisfied; 5) if the timing target is not satisfied, then perform logic decomposition of any complex logic gates on a path having a most negative slack value during the timing analysis and performing the retiming again; and 6) if the timing target is satisfied or there are no complex logic gates on a path having a negative slack value, optionally inserting a scan chain and performing automatic test pattern generation.

According to the method, if a complex logic gate is preventing further retiming on a critical path that does not satisfy slack constraints, the gate is decomposed into simple gates from the cell library that together perform the equivalent Boolean function. Retiming is then performed again to determine if logical decomposition further reduces latency.

Once die-level delay recovery is performed on the selected dies, a stack-level delay recovery can be performed by performing a retiming process over the stack as a whole. Complex logic can be decomposed if there on a path having a most negative slack. The timing analysis for the stack-level delay recovery can be based on the clock for the stack. If after performing the retiming and it is determined that the timing target is not being met, in some embodiments, a logic redistribution method can be applied.

Accordingly, embodiments of the invention incorporate a DfT delay recovery automation. The DfT delay recovery automation performs retiming. Retiming is an algorithmic approach to improving multiple aspects of circuit design post-synthesis by moving the positions of registers with respect to combinational logic while preserving circuit functionality. Embodiments of the invention use retiming algorithms to recover the latency added by boundary scan cell bypass paths in a 3D IC.

The DfT delay recovery automation performs retiming after insertion of the DfT features to the physical layout, which is usually performed after synthesis.

A DfT delay recovery automation can be executed by a processor to generate an optimized layout. In some implementations, the DfT delay recovery automation may be a software module that is a stand-alone tool or implemented as an add-on tool or module in a simulation/routing tool. Examples of simulation/routing tools include modeling, simulation, and/or synthesis tools by Cadence Design Systems, Inc., Synopsys, Inc., the open source community, and the like.

Figure 3:
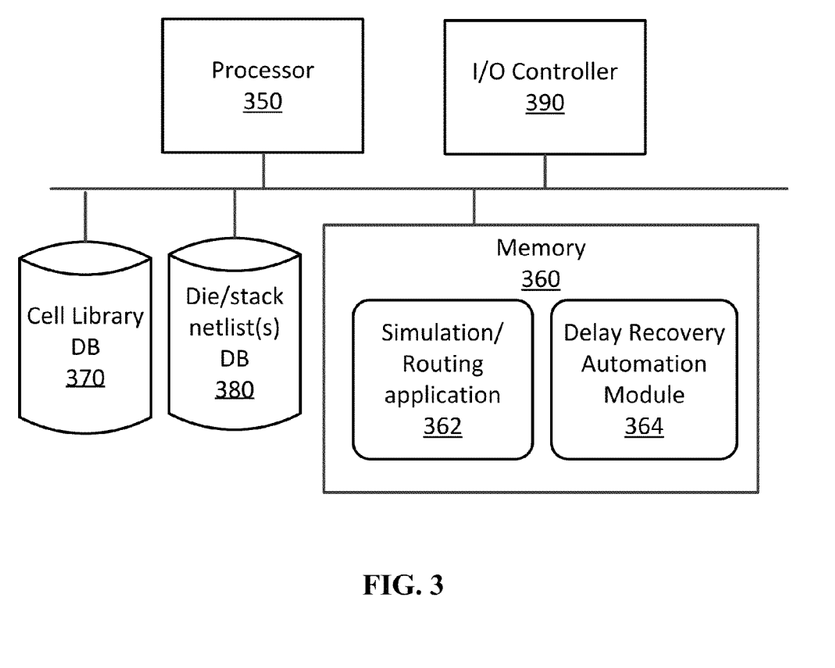
FIG. 3 illustrates a system in which the delay recovery automation may be implemented.

FIG. 3 illustrates a system in which the delay recovery automation may be implemented. Aspects of the system shown in FIG. 3 can be embodied as a server computer, mobile phone, a smart phone, a desktop computer, a tablet computer, and/or a laptop computer as some examples. Referring to FIG. 3, the system can include a processor 350 connected to components via a system bus; and a memory 360. The memory 360 may include system memory and mass storage (of any suitable computer-readable storage media), and can store an operating system and one or more application programs including a simulation/routing application 362 and/or a delay recovery automation module 364 of an embodiment. Directly connected via a bus or connected remotely via wireless methods (e.g., over a network), the system can further include a cell library database 370 and a die/stack netlist(s) database 380.

An input/output controller 390 can be included for receiving and processing input from a number of devices, including a keyboard, mouse, touch screen, touch pad, electronic stylus, or microphone; and for providing output to a display screen, a printer, speakers, or other type of output device.

It should be appreciated that the software components described herein may, when loaded into the processor 350 and executed, transform the processor 350 and the overall computer architecture from a general-purpose computing system into a special-purpose computing system customized to facilitate the functionality presented herein. The processor 350 may be constructed from any number of transistors or other discrete circuit elements, which may individually or collectively assume any number of states. More specifically, the processor 350 may operate as a finite-state machine, in response to executable instructions contained within the software modules disclosed herein. These computer-executable instructions may transform the processor 350 by specifying how the processor 350 transitions between states, thereby transforming the transistors or other discrete hardware elements constituting the processor 350.

Example—Die-Level Delay Recovery Illustration

Figure 4A:
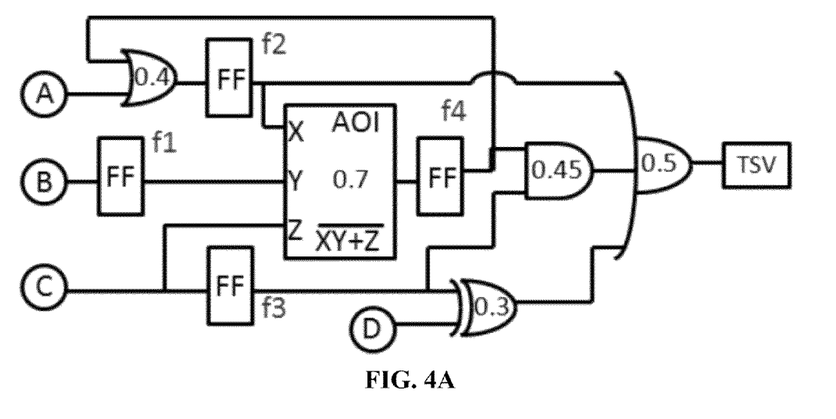
FIG. 4A shows a design before register insertion.

FIGS. 4A-4D illustrate a method of delay recovery for a DfT in a 3D IC applied at a die-level. The example circuit illustrated in FIGS. 4A-4D may be a bottom die of a 3D stack. FIG. 4A shows the circuit prior to wrapper insertion and retiming. Inputs A, B, C, and D are primary inputs. The circuit contains four flip flops (FF), labeled $f_1$ through $f_4$. Several logic gates exist between the flops and the TSV that connect to the next die in the stack. These are part of an incomplete logic circuit without the connected logic in the other stack tiers and are not observable during pre-bond scan test. Basic and complex logic cells are annotated with a delay value representing delay through the cell as a fraction of the clock cycle. For example, a value of 0.5 means that rise and fall delays from the inputs to the output of a logic gate is half of one clock period.

It should be understood that this example, and the timing data presented, is simplified for demonstration and does not consider additional data such as interconnect delay, fan-out, clock skew, or flop setup and hold times. It is assumed for this example that no path from a primary input or flop to another flop or to the TSV can have a delay greater than one clock period. In FIG. 4A, the longest delay is 0.95 of a clock period from flop $f_4$ to the TSV, so this timing constraint is satisfied.

Figure 4B:
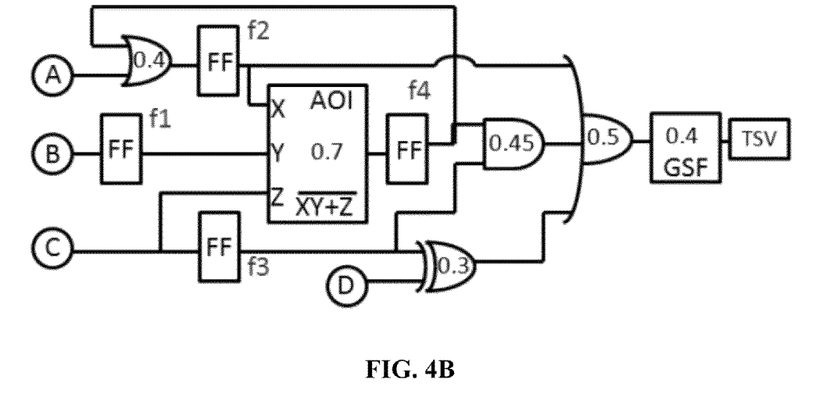
FIG. 4B shows a design after register insertion.

As illustrated in FIG. 4B, in order to provide controllability and observability, and present a standard test interface, a wrapper is next added to the die. For the example circuit, a boundary GSF is inserted between the die logic and the TSV. In its bypass mode, the GSF contributes an additional 0.4 delay to any path through the TSV. For the path from flop $f_2$ to the TSV, this is acceptable, since the overall path delay is only 0.9 clock cycles. However, three paths now violate the timing constraints—the paths from $f_3$ and $f_4$ to the TSV at a delay of 1.35 clock cycles each, and the path from D to the TSV at a delay of 1.2 clock cycles.

According to embodiments, retiming is performed to recover the latency added to paths through the TSV by moving registers to ensure that no path violates the timing constraint.

Figure 4C:
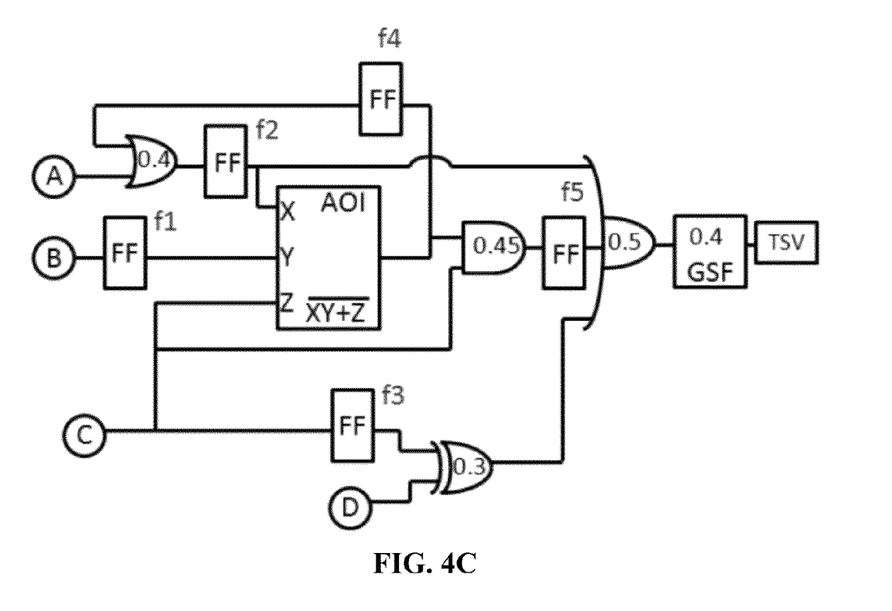
FIG. 4C shows a first register movement.
Figure 4D:
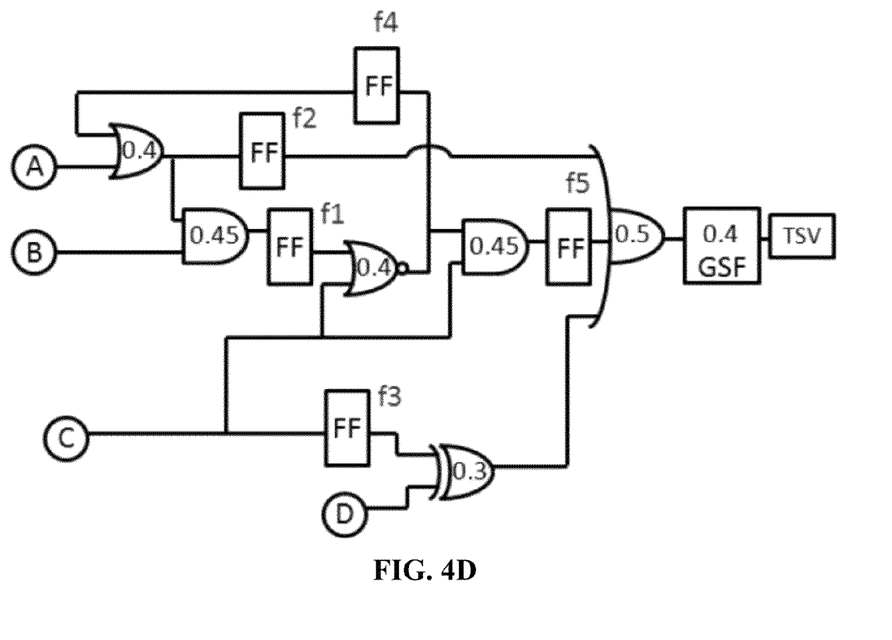
FIG. 4D shows logic decomposition and second register movement.

FIG. 4C illustrates a retiming step. In this retiming step, flops $f_3$ and $f_4$ on the AND gate inputs are pushed forward to its output. The AND gate's inputs now come directly from C and the complex AND-OR-Invert (AOI) gate without latching, and its output is instead latched. This requires the addition of an extra flop $f_5$ at the AND gate's output. The extra flop is created because a flop ($f_4$) is still required on the feedback loop from the AOI gate to flop $f_2$ in order to preserve functionality. Likewise, a flop ($f_3$) is still required between C and the XOR gate. Now, the path from flop $f_5$ to the TSV satisfies the timing constraint with a delay of 0.9 cycles. On the other hand, the path from flop $f_2$ to flop $f_5$ now violates the constraint with a delay of 1.15 clock cycles.

At this point, further retiming cannot satisfy the timing constraint. If $f_2$ is pushed to the output of the AOI gate, then the path from A to $f_2$ will violate timing constraints. If $f_5$ is moved to the inputs of the AND gate, then the circuit returns to its state in FIG. 4B. The AOI gate does not allow any further retiming.

According to a further embodiment, the complex AOI gate is decomposed into basic logic gates from a cell library—an AND and NOR gate. Compared to its decomposed gates, the AOI gate provided for a shorter delay for the Boolean function it performed and required less die area. However, the basic logic gates allow more avenues for retiming. Flops $f_1$ and $f_2$ can now be pushed from the inputs of the AOI to the output of the AND gate added after decomposition, and retiming can result in the arrangement shown in FIG. 4D. All paths now satisfy the timing constraint and retiming is complete. Although there is less slack in the circuit overall after the addition of the boundary GSF and the decomposition of the AOI gate, the slack is redistributed among all paths so that no single path experiences a timing violation.

Example—Die-Level Delay Recovery

Retiming can be performed either at the die- or stack-level. In the example illustrated in FIGS. 4A-4D, retiming was performed at the die-level, or in other words, on a single die of a 3D stack without knowledge of the circuitry on other dies. Die-level retiming allows greater control over the redistribution of slack throughout the stack. For example, a designer may not want to move any registers on a particular die D but would still like to recover the additional latency of adding a wrapper to that die. In this case, additional (dummy) delay can be added to the TSV paths on the dies adjacent to D. Retiming can then be performed on the adjacent dies in an attempt to recover the additional path delay due to the wrapper cells in the adjacent dies and the wrapper cells of D.

Figure 5:
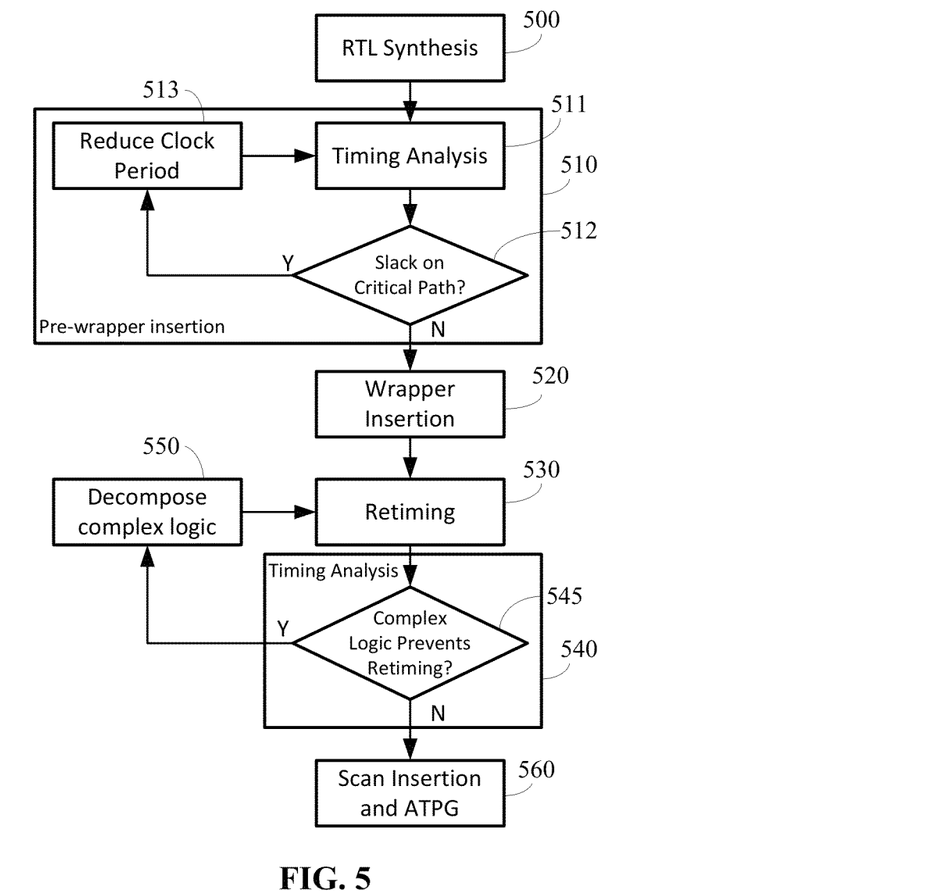
FIG. 5 illustrates a design flow according to an embodiment.

FIG. 5 illustrates a design flow according to an embodiment. First, the design is synthesized into a structural circuit definition (500). In die-level retiming, paths crossing the TSV interface are incomplete and the total delay across these paths cannot be considered. Since paths crossing die boundaries are likely to be the least-slack paths in a 3D stack, the clock period for the stack (such as described as being used in the illustrative example shown in FIGS. 4A-4D) may be too large to provide a tight timing constraint considering a single die. In order to determine an appropriate timing target (510), timing analysis (511) can be performed to identify the amount of slack on the least-slack path of the die. A determination of slack amount is made (512), and the target clock period for retiming is incrementally reduced (513) until the least-slack path has no positive slack. Wrapper insertion can then be performed (520), adding delay to the TSV paths equal to the bypass path through a boundary GSF.

During retiming (530), boundary GSFs are fixed so that the retiming algorithm does not consider them as movable registers nor does it attempt to move logic or other registers past the GSFs. Timing information for the logic gates, flip flops, and GSFs can be extracted from the cell library. After the retiming algorithm has executed, timing analysis (540) is again performed to determine if all paths in the die satisfy the target timing constraint. If they do not, the path that has the most negative slack is examined to determine if complex logic gates on the path may be preventing retiming (545). If complex logic gates are preventing retiming, they are decomposed (550) into simple logic cells from the cell library and retiming (530) is performed again. This process continues until all paths meet the timing target or no complex logic gates are restricting retiming. Finally, scan insertion and automatic test pattern generation (ATPG) are performed for the die (560).

Example—Stack-Level Delay Recovery

While die-level retiming does not consider the total path delay for paths that cross die boundaries, stack-level retiming can exploit this added degree of freedom. In stack-level retiming, the complete stack undergoes retiming as a monolithic entity. The boundary GSFs are once again fixed during retiming to prevent the movement of logic from one die to another. During stack retiming, the intended clock frequency for the stack can be used as a timing target since all circuit paths are known. While die-level retiming provides more control over slack redistribution, stack-level retiming provides greater leeway to the retiming algorithm. To illustrate this point, consider a three-die stack where each boundary GSF adds an additional 0.2 clock period delay to a path. A path crossing all three dies from the bottom to the top of the stack would experience an additional 0.8 clock period delay after wrapper insertion—0.2 delay from both the bottom and top dies and 0.4 delay from the middle die. In die-level retiming of all the dies in the stack, 0.2 clock periods of delay would have to be recovered in each of the top and bottom dies of the stack, and 0.4 delay would have to be recovered in the middle die. In stack-level retiming, extra slack can redistributed to the path regardless of which die can supply the slack. To recover the entire 0.8 clock period of delay added to the path, 0.1 delay can be recovered from the lowest die, 0.3 from the middle die, and 0.4 from the top die.

The flow for stack-level retiming is similar to the die-level retiming flow of FIG. 5. Since the clock period of the stack is known, it can be used as a timing constraint for retiming. For this reason, step (510) may be omitted because no timing analysis or tightening of the clock period needs to be performed before wrapper insertion. Retiming (530), logic decomposition (550), and scan insertion and ATPG (560) can be performed as they were for die-level retiming.

Example—Logic Redistribution—Illustration

Figure 6A:
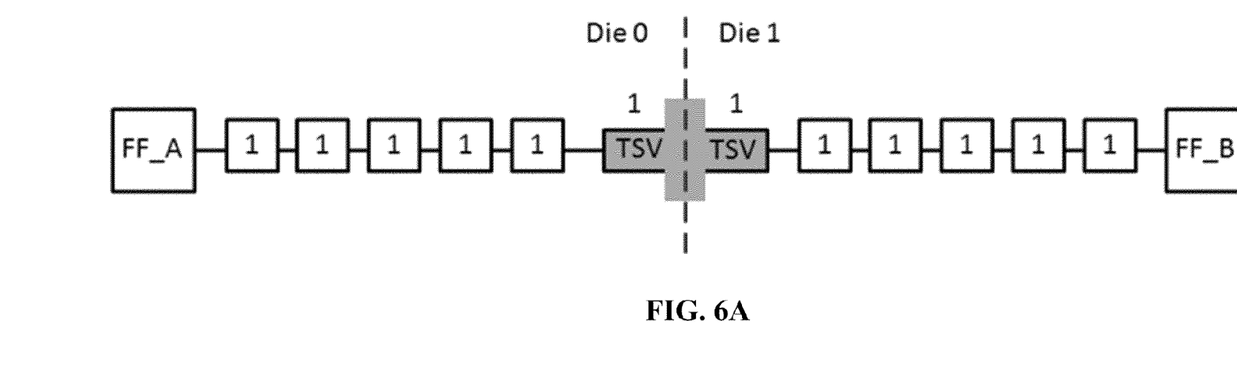
FIG. 6A shows a design before register insertion.

A logic redistribution algorithm can be included when applying retiming to a stack layout after wrapper insertion to make use of excess slack during die-level retiming. FIGS. 6A-6D illustrate a process flow for logic redistribution according to an embodiment. FIG. 6A shows a design with an inter-die path between flip-flop A (FF_A) on Die 0 and flip-flop B (FF_B) on Die 1 in a hypothetical stack before wrapper/register insertion or retiming. The full path consists of 10 logic cells each with a delay of 1 ns and two TSVs, each also with a delay of 1 ns. The entire path has a delay of 12 ns, and the timing constraint may be that no path in the circuit can have a delay greater than 13 ns.

Figure 6B:
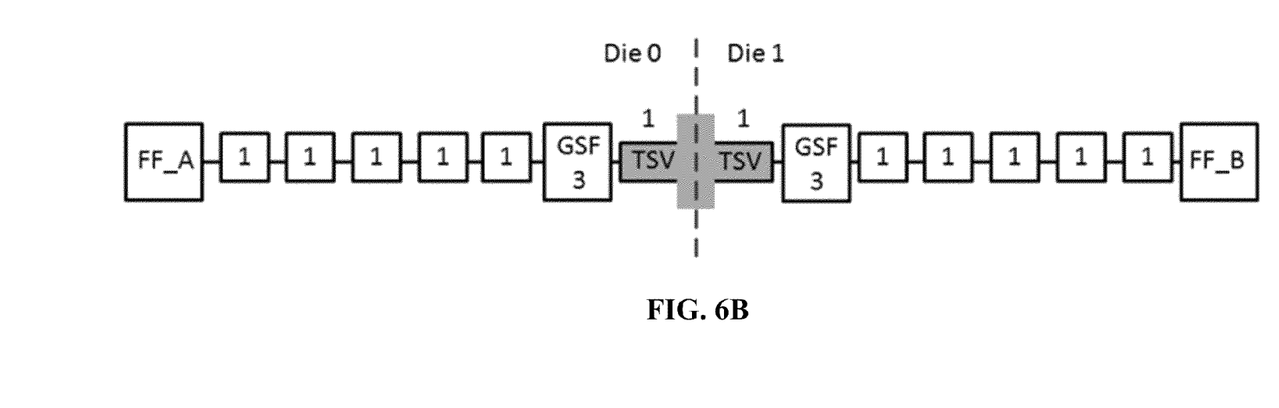
FIG. 6B shows a design after register insertion.
Figure 6C:
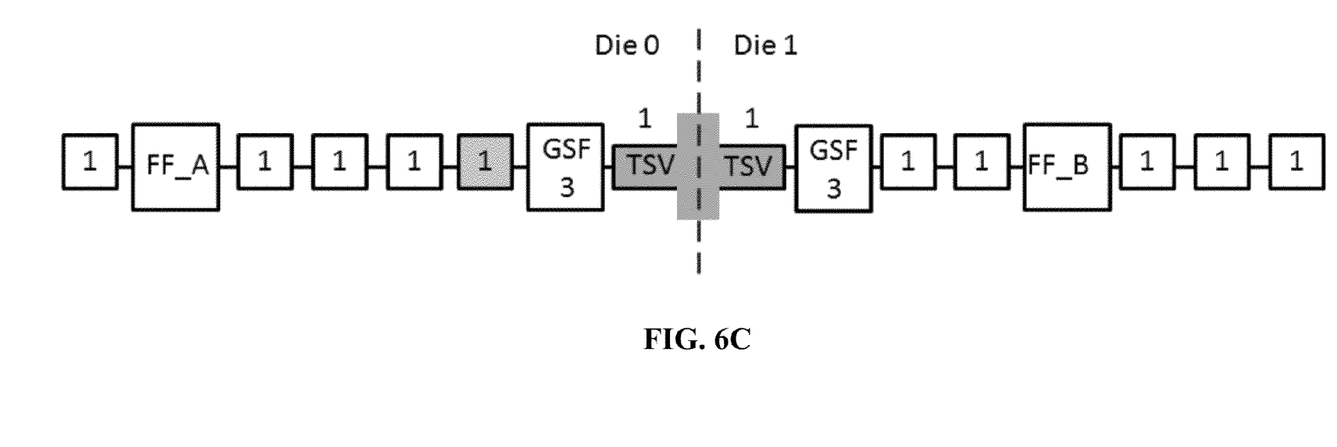
FIG. 6C shows die-level retiming before logic redistribution.
Figure 6D:
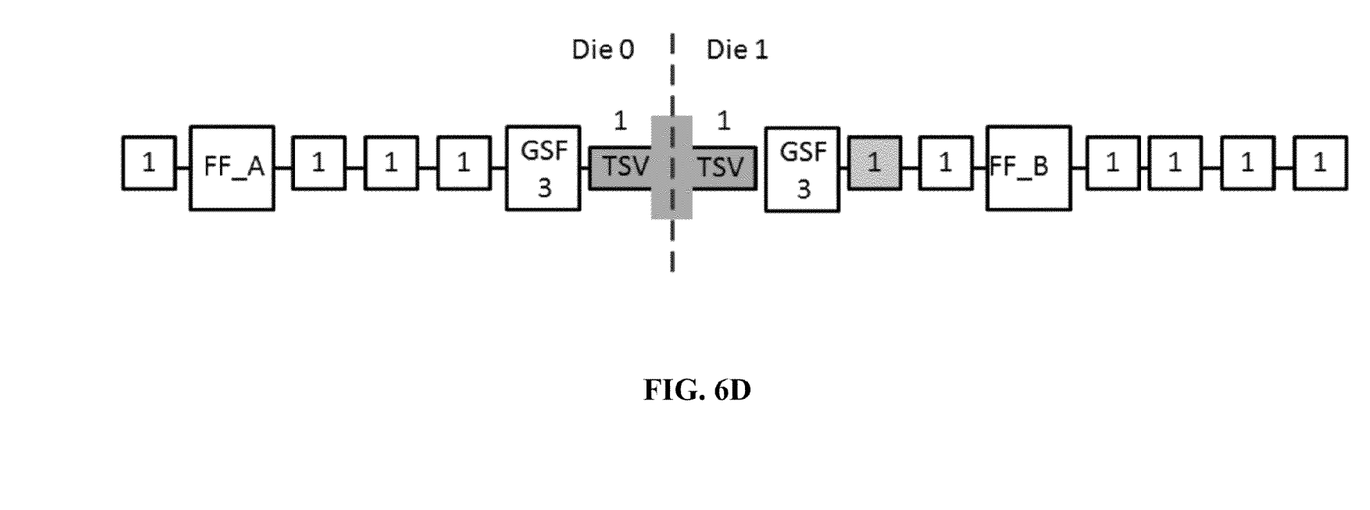
FIG. 6D shows die-level retiming after logic redistribution.

Each die contains five logic cells and one TSV of the path. For the example, there exists enough slack on Die 0 such that FF_A can be moved toward its TSV by one logic cell, and on Die 1 there is enough slack for FF_B to be moved toward its TSV by four logic cells. FIG. 6B shows the path after wrapper cell insertion, where each wrapper cell (GSF) contributes 3 ns of delay in functional mode. Now, the full path requires 18 ns for signal propagation, well above the timing constraint limit of 13 ns. During die level retiming of Die 0, as shown in FIG. 6C, FF_A can only be moved to regain 1 ns of delay, thus violating its timing constraints. for Die 1, FF_B will be moved to regain 3 ns of delay, recovering all of the additional delay. Thus, with die-level retiming, the path violates the overall timing constraint by 1 ns, even though there is additional slack on Die 1 that would be appropriately allocated during stack-level retiming. A die-level solution to this problem would be to move one logic cell, the grayed cell, from Die 0 to Die 1 by pushing it across the die boundary as shown in FIG. 6D. Now, when die-level retiming is performed, Die 1 will recover 4 ns of delay as in FIG. 6D and the timing constraint for the path will be met.

Example—Logic Redistribution—Algorithm

Figure 7:
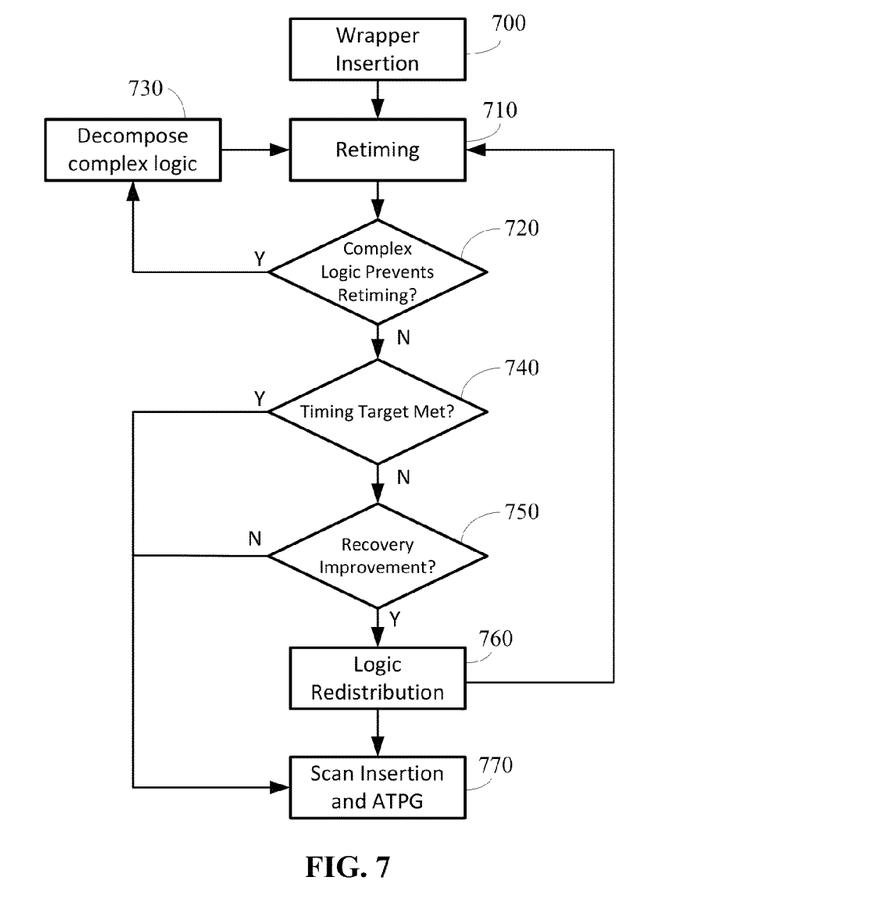
FIG. 7 shows a process flow including logic redistribution according to an embodiment.

FIG. 7 shows a process flow including logic redistribution according to an embodiment. Beginning after inserting the wrapper (700), retiming may be performed (710) and if complex logic is determined to be preventing retiming (720), the complex logic is decomposed (730) and retiming (710) is performed again. A logic redistribution algorithm such as provided in this example can be performed after complex logic decomposition (730). If timing targets (740) are met, then no logic redistribution is necessary and scan insertion and ATPG (770) can take place. If, on the other hand, timing targets (740) are not met after die-level retiming (710), then logic redistribution (760) can be performed in an attempt to achieve additional delay recovery. Logic redistribution is performed (760), followed by retiming and logic decomposition if necessary, until either no recovery improvement (750) is achieved, in which case scan insertion and ATPG are performed (770) on the last netlist that resulted in delay recovery improvement, or until all timing constraints (740) are met.

For any given iteration, the logic redistribution algorithm attempts to shift logic one cell at a time on the most critical inter-die path from one die to its adjacent die. Retiming is then performed again, and if necessary another iteration of the logic redistribution algorithm takes place. This allows the algorithm to target either the same path for further improvement or a new path if that path becomes the predominant critical path.

Figure 8:
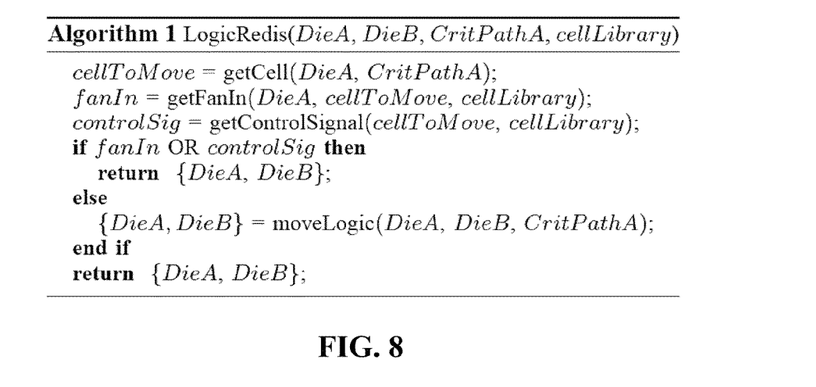
FIG. 8 shows the pseudocode for the logic redistribution algorithm (LogicRedis) given as Algorithm 1.

FIG. 8 shows the pseudocode for the logic redistribution algorithm (LogicRedis) given as Algorithm 1. The algorithm receives as input the netlists for two dies, DieA and DieB, that are adjacent to another and share the critical path CritPathA. The library of standard cells, cellLibrary, is also received as input. The algorithm attempts to move one logic cell from the critical path on DieA to DieB.

The LogicRedis begins by identifying the logic cell that must be moved through the getCell function. This function takes the netlist for DieA and the critical path identification and finds logic cell on the critical path on DieA closest to the TSV and returns its unique name standard cell type, which are assigned to the data structure cellToMove. Next, a determination is made as to whether or not the cell can be moved to DieB.

During logic redistribution, TSVs cannot be added or subtracted between the adjacent dies. Whether moving logic cells from a transmitting die to a receiving die or vice versa, a logic cell with a fan-in greater than one or that requires a control signal (such as a transmission gate) cannot be moved without adding or removing TSVs. There are two exceptions to this rule. The first is a logic cell with fan-in greater than two but with all inputs except for the TSV input tied to either $V_{dd}$ or ground. The second is a logic cell with a control signal that is tied to $V_{dd}$ or ground. The getFanIn function returns true if the logic cell (cellToMove) passed to it has a fan-in greater than one and at least two fan-in nets are not connected to $V_{dd}$ or ground. The getControlSignal function returns true if the passed logic cell requires a control signal and that signal is not tied to $V_{dd}$ or ground.

If moving the logic cell would violate the constraint that TSVs cannot be added or removed—that is, if either fanIn or controlSig is true—then the input netlists DieA and DieB are returned without modification. If, instead, the logic cell can be safely moved from DieA to DieB, then the moveLogic function performs the logic redistribution and returns new netlists for DieA and DieB. These new netlists are then returned in order to perform die-level retiming once again such that the new netlists may lead to better delay recovery.

The LogicRedis algorithm terminates under two circumstances. The first is after moving a single logic cell, in which case both fanIn and controlSig are false and the DieA and DieB netlists are updated with the moved logic and returned. If the algorithm is terminated in this way, then retiming is performed again and the result is checked to see if the timing target is met or if there is recovery improvement as illustrated in FIG. 7. The second termination criterion is that no logic cell can be moved without adding or subtracting a TSV, in which case either or both of the fanIn and controlSig variables will be true. In this case, the DieA and DieB netlists are returned unchanged and no further retiming is possible.

The algorithm for logic movement is of complexity O(n) with regard to the size of the netlist of DieA. The getCell function is O(n) because it searches the netlist for the cell to be retimed, whose inputs and outputs match those of the critical path identification. The functions getFanIn and getControlSignal are constant time, as they only require checking the inputs and outputs of a standard cell definition. Likewise, the moveLogic function is constant time as it requires adding or removing the previously identified logic cell and two wire definitions from each netlist.

The limitation on adding or removing TSVs during logic redistribution limits how close die-level retiming can come to stack-level retiming. Consider a worst-case retiming scenario in a two-die stack where a cross-die critical path exists such that most of the path logic is on Die 0 while only a single logic cell of the path is on Die 1. During stack level retiming, the burden of recovering the timing latency of the path is almost entirely on Die 0, while retiming of Die 1 may not consider the path to be critical at all if only a small portion of the path is on Die 1. In this case, it is beneficial to move some of the path logic from Die 0 to Die 1 to evenly distribute the retiming burden between the dies, or possibly to move all of that path logic to Die 1 if Die 1 has a significant amount of slack that can be moved onto the path while Die 0 has none.

If the entire path across both dies consist of logic cells that satisfy the TSV constraints—that is, any or all cells can be moved between the dies—then die-level retiming can achieve the same results as stack-level retiming for that particular path. This is because a logic distribution can be found such that each die is capable of providing all extra slack it can to that path. In real circuits, however, it is likely that only some logic on some critical paths will meet the TSV requirements for logic redistribution, and therefore stack-level retiming will outperform die-level retiming.

Example—Simulation Results

For the example simulations, the retiming algorithm used to apply to the circuits is from Synopsys Design Compiler, which performs retiming first to minimize clock period and then to minimize register count. This is followed by a combinational logic optimization step in view of changes to loading on cells and critical paths that may have occurred after the movement of registers.

The effectiveness and impact of post-DfT-insertion retiming on a benchmark circuit that has been partitioned into two-, three-, and four-die stacks was examined. A number of Open-Core benchmarks, obtained from an open source project originating from OpenCores.org, were used.

To show retiming, the performance-optimized data encryption standard (DES) circuit and the Fast Fourier Transform (FFT) circuit from the IWLS 2005 OpenCore benchmarks were used. The DES circuit contains 26,000 gates and 2,000 flops, while the FFT circuit contains 299,273 gates with 19,962 flops. They contain no embedded, wrapped modules or black boxes, so retiming can target any gates or flops in the design. The DES circuit was partitioned into two-, three-, and four-die stacks and FFT circuit was partitioned into two- and four-die stacks using NanGate Open Cell Library, and a placement engine that optimized timing.

The OpenRISC1200 (OR1200) 32-bit scalar RISC processor, also available from OpenCore, is used as a benchmark with modules that cannot be retimed. The OR1200 has a 5 stage integer pipeline and IEEE 754 compliant single precision floating point unit. The OR1200 implementation used in these simulations contains a one-way direct-mapped 8 KB data cache and one-way direct-mapped 8 KB instruction cache. The processor contains 15,000 cells with 1850 flip-flops and utilizes a 250 MHz clock frequency.

A 3D modular benchmark was created by partitioning the OR1200 processor across two dies. Many modules were fixed, meaning that they could not be retimed, and were placed in their entirety on one die or the other. Fixed modules generally include modules where retiming may move critical registers that can interfere with timing closure, such as the decode, execute, memory, and writeback stages of the processor pipeline. The modules that were allowed to be retimed are the debug unit, exception logic, floating point unit, freeze logic, instruction fetch, load/store unit, programmable interrupt controller, power management, and SPR interface. These modules were split across the dies in such a way that logic that may be retimed existed on both sides of each TSV. This was done because, barring interconnects, no logic existed between modules. The modules that may be retimed in this benchmark take the place of complex logic between modules. If a fixed module were on either side or both sides of a TSV belonging to a critical path, then retiming may have no impact on delay recovery.

To approximate the bypass mode delay of a GSF, a GSF was created in HSPICE using a low-power 45 nm process. Input-to-output rise and fall times were determined from simulation. To model wrapper insertion, a number of inverters from the cell library were added before each TSV and each face pad for TSV bonding to approximate the delay of bypass mode GSFs.

Table I shows a comparison of delay, area, and pattern count results for die- and stack-level retiming for the DES logic circuit partitioned across (a) two, (b) three, and (c) four dies. The columns present data first for die-level retiming starting with the lowest die in the stack (Die 0) and moving to the highest die in the stack. The last column shows data for stack-level retiming. The first row of the table lists the percent of delay recovered during retiming on the least-slack TSV path. A value of 100 means that all delay on all TSV paths was recovered. The second row indicates the area overhead of DfT-insertion as a percentage of total area, or the sum of cell area and interconnect area. Interconnect area is estimated from wire load models included with the cell library. The third row indicates the percentage of total area overhead after retiming. The last row presents the percent change in pattern count for stuck-at patterns between ATPG before DfT-insertion and ATPG after retiming. A negative value indicates that pattern count decreased.

TABLE I

| | Die 0 | Die 1 | Die 2 | Die 3 | Complete Stack |
|---|---|---|---|---|---|
| (a) Two-Die Stack | | | | | |
| % Delay Recovered | 100 | 100 | | | 100 |
| % Area Overhead After Wrapper Insertion | 16.3 | 16.4 | | | 18.7 |
| % Area Overhead After Retiming | 12.4 | 13.4 | | | 16.6 |
| % Change in Pattern Count | −7.4 | 3.0 | | | 10.9 |
| (b) Three-Die Stack | | | | | |
| % Delay Recovered | 100 | 100 | 100 | | 100 |
| % Area Overhead After Wrapper insertion | 20.0 | 29.8 | 26.2 | | 26.2 |
| % Area Overhead After Retiming | 19.7 | 29.1 | 24.2 | | 25.0 |
| % Change in Pattern Count | 3.3 | 6.2 | −1.4 | | 12.7 |
| (c) Four-Die Stack | | | | | |
| % Delay Recovered | 100 | 100 | 60 | 100 | 100 |
| % Area Overhead After Wrapper Insertion | 22.7 | 35.5 | 35.6 | 28.5 | 31.9 |
| % Area Overhead After Retiming | 16.1 | 34.1 | 34.6 | 25.9 | 27.5 |
| % Change in Pattern Count | −2.5 | −4.2 | 0.8 | 5.3 | 8.1 |

Table II shows a comparison of delay, area, and pattern count results for die- and stack-level retiming for the FFT logic circuit partitioned across (a) two and (b) four dies. As can be seen from Table II, the FFT two- and four-die benchmarks show similar results to the DES stacks.

TABLE II

| | Die 0 | Die 1 | Die 2 | Die 3 | Complete Stack |
|---|---|---|---|---|---|
| (a) Two-Die Stack | | | | | |
| % Delay Recovered | 100 | 100 | | | 100 |
| % Area Overhead After Wrapper Insertion | 0.9 | 1.1 | | | 1.2 |

TABLE II-continued

|  | Die 0 | Die 1 | Die 2 | Die 3 | Complete Stack |
|---|---|---|---|---|---|
| % Area Overhead After Retiing m | 1.1 | 1.1 |  |  | 1.2 |
| % Change in Pattern Count | 3.9 | −3.0 |  |  | 6.4 |
| (b) Four-Die Stack | | | | | |
| % Delay Recovered | 100 | 100 | 100 | 100 | 100 |
| % Area Overhead After Wrapper Insertion | 2.1 | 2.3 | 2.5 | 1.9 | 2.4 |
| % Area Overhead After Retiming | 2.0 | 2.1 | 2.4 | 1.5 | 2.2 |
| % Change in Pattern Count | 1.1 | 5.1 | 0.8 | −0.4 | 7.8 |

Table III provides retiming results for the four-die FFT benchmark when one or two dies are fixed, meaning that they cannot be retimed. In particular, Table III shows a comparison of delay recovery with fixed dies for the four-die FFT logic circuit partitioned considering the case where (a) one and (b) two dies cannot be retimed.

Since there is added latency to the inter-die critical paths on the fixed dies, tighter timing constraints are added to the dies that may be retimed. This makes retiming more difficult on the dies, but ensures that the added delays on the fixed dies are taken into account during retiming. The first column displays which dies are fixed and the results given are for percentage delay recovery. Table IV shows results from the experiments of Table III with the addition of the algorithm to move logic between dies in an attempt to improve results. Results are only given for experiments where two adjacent dies are unfixed, as logic cannot be moved to fixed dies.

TABLE III

| Fixed Die | Die 0 | Die 1 | Die 2 | Die 3 | Complete Stack |
|---|---|---|---|---|---|
| (a) One Fixed Die | | | | | |
| Die 0 | — | 100 | 100 | 100 | 100 |
| Die 1 | 87.5 | — | 100 | 100 | 100 |
| Die 2 | 100 | 100 | — | 100 | 100 |
| Die 3 | 100 | 100 | 100 | — | 100 |
| (b) Two Fixed Dies | | | | | |
| Dies 0, 1 | — | — | 75.0 | 82.5 | 100 |
| Dies 2, 3 | 50.0 | 62.5 | — | — | 71.9 |
| Dies 0, 2 | — | 62.5 | — | 82.5 | 84.4 |
| Dies 1, 4 | 37.5 | — | 50.0 | — | 68.8 |

As can be seen from the results in Table III, retiming recovered 100% of the additional GSF bypass mode delay in most cases. The one exception to this is Die 2 of the four-die stack under die-level retiming.

For the benchmark circuit used in this experiment, retiming becomes more difficult as the circuit is partitioned across more dies. During both die-level and stack-level retiming, slack can only be redistributed from within a die, since logic and registers will not be moved between dies. As the circuit is partitioned between more dies, there are fewer paths on each individual die from which to take excess slack. Furthermore, more paths will cross die boundaries and be subject to additional delay after GSFs are added during DfT-insertion. This increased difficulty of retiming is reflected in the lower recovered delay of Die 2 of the four-die stack.

Table I(c) (and even Tables III, IV, and V below) demonstrates the greater effectiveness of stack-level retiming versus die-level retiming with regard to slack redistribution for the cases implemented in the simulations. If the four-die stack were to be assembled after die-level retiming, an additional delay would exist on some of the paths that cross into Die 2 from Dies 1 and 3. This delay would be no worse than 40% of the delay of a GSF in bypass mode. This delay exists because not enough positive slack paths are present on Die 2 or because the extra slack present on Die 2 could not be distributed to TSV paths that violated timing constraints during retiming. During stack retiming, Die 2 would present the same difficulties to the retiming algorithm. However, since all dies are retimed simultaneously and complete paths that cross dies are known, slack could be redistributed on the other dies in the stack to make up for the restrictions of Die 2.

For the DES benchmark and die partitioning used in this disclosure, the area overhead of DfT-insertion ranged from 16.3% for Die 0 of the two die stack to 35.6% for Die 2 of the four die stack. Area overhead decreased with retiming, as the retiming algorithm retimes for area minimization after clock period minimization. The area overheads are relatively large because with die partitioning many paths crossed dies and so many TSVs were introduced to the circuit. Compared to the number of cells on each partitioned die before DfT-insertion, the number of GSFs added after DfT-insertion accounted for a large number of the total number cells. As the number of dies in a partition increased, the number of cells on each die before DfT-insertion decreased. Thus, the area overhead of DfT-insertion generally decreased as the stack became larger. The area overhead was also shown to be worse for the inner dies of a stack, since these require GSFs both on TSV paths and on paths that contain face-side pads that will be bonded to TSVs on another die during stack assembly.

To illustrate this effect, consider the DES circuit evenly distributed among dies in a four die stack. In this case, each die would have about 6500 cells. Assume that each die has 500 connections with each adjacent die. The Die 0 and Die 3 of the stack would each have 500 GSFs, or 8% of the cells on the die. In comparison, Die 1 and Die 2 would each have 1000 GSFs, which is over 15% of the cells on the die. The area impact of GSF insertion would be significantly less if the dies themselves were more complex, with a higher cell count relative to the number of TSVs per die. For example, if a die contained one-million cells and 10,000 TSVs, then adding GSFs to a die would only account for 1-2% of the number of cells on the die, depending on whether or not the die were in the middle of the stack.

Table III(a) shows that, generally, there is enough slack present in the FFT circuit such that three of the four dies are capable of recovering their own timing overhead as well as that of the fixed die. This is not the case when two dies are fixed, as seen in Table III(b), though better stack-level retiming results hold true in this case. Furthermore, utilizing the logic-movement algorithm to push logic cells between dies can be used to improve die-level retiming under two fixed dies as seen in Table IV. In the case of Die 1 when Dies 2 and 3 are fixed, there is a delay recovery improvement from 62.5% recovery without logic movement to 75% recovery with logic movement, or a 16.7% increase in delay recovery. In the case where Dies 2 and 3 were fixed, logic movement had no effect.

This example of logic redistribution provides insight into when logic redistribution can improve results and how much improvement can be expected. Table IV shows a comparison of delay recovery with fixed dies and the addition use of the logic movement algorithm for the four-die FFT logic circuit with two fixed dies. As demonstrated by Table IV, stack-level retiming, in general, produces better results than die-level retiming even with logic redistribution, and logic redistribution does not change stack-level retiming results. This is because stack-level retiming already considers the complete inter-die paths, so logic redistribution will never result in delay recovery improvements (or delay recovery reductions), and at best die-level retiming can only match stack-level retiming.

TABLE IV

| Fixed Dies | Die 0 | Die 1 | Die 2 | Die 3 | Complete Stack |
|---|---|---|---|---|---|
| Dies 0, 1 | — | — | 75.0 | 82.5 | 100 |
| Dies 2, 3 | 50.0 | 75 | — | — | 71.9 |

Additional insights are also gained when considering the effect of redistribution with Die 0 and Die 1 fixed, or Die 2 and Die 3 fixed. In the former case, no improvement is seen as the critical paths contained no logic that could potentially be moved. In the latter case, there is improvement in the delay recovery on Die 1, as some logic is moved to Die 0, which contained some additional slack to be provided to the path. However, there is no improvement on Die 0 since its most critical path had no movable logic. Based on this observation, it appears that logic redistribution is useful when two conditions are satisfied—there is movable logic on a die's most critical path, and there is additional slack on the adjacent die's portion of that path.

Delay recovery is also more difficult in a circuit with modules that cannot be retimed, as shown in Table V with the OR1200 results. Table V shows a comparison of delay, area, and pattern count results for die- and stack-level retiming for the OR1200 processor partitioned across two dies. Though die-level retiming provided less delay recovery compared to other benchmarks, with 37.5% recovery for Die 0 and 50% recovery for Die 1, stack-level retiming still provided good results, with an overall 92% delay recovery.

TABLE V

|  | Die 0 | Die 1 | Complete Stack |
|---|---|---|---|
| % Delay Recovered | 37.5 | 50 | 92 |
| % Area Overhead After Wrapper Insertion | 6.1 | 4.6 | 7.2 |
| % Area Overhead After Retiming | 5.2 | 4.4 | 6.3 |
| % Change in Pattern Count | 0.1 | 0.6 | 2.9 |

The effect of DfT-insertion and retiming on stuck-at fault pattern count was found to be negligible. In some cases, such as Die 0 of the two die DES stack or Die 2 of the three die DES stack, this resulted in fewer test patterns after retiming. In other cases, such as Die 1 of the two die DES stack or Die 0 and Die 1 of the three die DES stack, retiming incurred a small increase in pattern count. It should be noted that when scan insertion is performed for the complete stack, scan chains are allowed to span multiple die layers. This is not the case when scan insertion is performed on a per-die basis. Thus, there is a significant difference in the number of test patterns produced after stack-level scan insertion when compared to die-level scan insertion.

Run times for the retiming algorithm were generally in minutes per die, but longer for a complete stack and larger benchmark. For example, the run time for the complete four die DES stack was 12.4 minutes. For each die, the run times (in minutes) were 3.5, 2.7, 2.6, and 2.2 for Die 0, Die 1, Die 2, and Die 3, respectively. For the FFT four-die benchmark, run times in minutes for die-level retiming were 9.4, 10.6, 10.2, and 9.1 for Die 0, Die 1, Die 2, and Die 3, respectively, while stack-level retiming required 41.5 minutes.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Carrier waves and other propagating signals that may contain data usable by a computer system are not themselves "computer-readable storage media."

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" do not consist of carrier waves or propagating signals.

In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Example scenarios have been presented to provide a greater understanding of certain embodiments of the present invention and of its many advantages. The example scenarios described herein are simply meant to be illustrative of some of the applications and variants for embodiments of the invention. They are, of course, not to be considered in any way limitative of the invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A method of delay recovery for a 3D IC comprising a stack of at least two dies and having a design-for-testing (DfT) die wrapper with boundary registers, the method comprising:
   applying a retiming process after die wrapper insertion to a synthesized register transfer level (RTL) design of the 3D IC, wherein boundary registers of the die wrapper located between a logic block and a through-silicon-via (TSV) are set as a fixed register so that the boundary register is not moved and logic or another register is not moved between the boundary register and the TSV during the retiming process.

2. The method according to claim 1, wherein the retiming process is applied to a selected die of the stack of dies of the 3D IC.

3. The method according to 2, wherein the retiming process comprises determining a timing target by identifying an amount of slack on a least-slack path of the selected die in a pre-die wrapper insertion condition and incrementally reducing a target clock period until the least-slack path has no positive slack.

4. The method according to 2, further comprising:
   performing logic decomposition to a complex logic gate on a path having a negative slack value; and
   applying a second retiming process after performing the logic decomposition.

5. The method according to claim 1, wherein the retiming process is applied across the stack.

6. The method according to claim 5, further comprising:
   performing logic decomposition to a complex logic gate on a path having a negative slack value;
   applying a second retiming process after performing the logic decomposition; and
   applying a logic redistribution process to move logic between adjacent dies of the stack.

7. The method according to claim 1, wherein the boundary register is a gated scan flop comprising a bypass transmission gate configured to pass a functional input to the gated scan flop to the TSV during a functional operation.

8. The method according to claim 1, further comprising:
   receiving a selection of a first die of the stack to omit from retiming;
   inserting a dummy delay to a TSV path on a second die adjacent to the first die; and
   applying the retiming process for the second die.

9. A method of delay recovery for a design-for-test (DfT) in a 3D IC, comprising:
   performing a retiming process that considers a boundary register for a DfT wrapper between a logic block and a through-silicon-via (TSV) as a fixed register so that the boundary register is not moved and logic or another register is not moved between the boundary register and the TSV;
   performing a timing analysis to determine if a timing target is satisfied or not satisfied;
   in response to a determination that the timing target is not satisfied, determining whether a complex logic gate is on a path having a most negative slack value during the timing analysis; and
   in response to a determination that the complex logic gate is on the path having the negative slack value, performing logic decomposition of the complex logic gate and performing the retiming process on a resulting structural circuit definition, wherein the timing analysis, retiming process, and logic decomposition are performed until the timing analysis determines that the timing target is satisfied or no complex logic gate is on the path having the most negative slack value.

10. The method according to claim 9, wherein the retiming process is performed for a stack of dies of the 3D IC, wherein the timing target is a clock period of the stack.

11. The method according to claim 9, wherein the timing target is determined by:
    identifying an amount of slack on a least-slack path of a selected die of a stack and incrementally reducing a target clock period until the least-slack path has no positive slack.

12. The method according to claim 9, wherein the boundary register is a gated scan flop comprising a bypass transmission gate configured to pass a functional input to the gated scan flop to the TSV during a functional operation.

13. The method according to claim 9, further comprising:
    in response to a determination that the timing target is satisfied or that no complex logic gate is on the path having the most negative slack value, inserting a scan chain and performing automatic test pattern generation.

14. The method according to claim 1, further comprising:
    receiving a selection of a first die of the stack to omit from retiming;
    inserting a dummy delay to a TSV path on a second die adjacent to the first die; and
    performing the retiming process for the second die.

15. A computer-readable storage medium having stored thereon instructions that, when executed, cause a processer to perform a method comprising:
    performing a retiming process that considers a boundary register for a DfT wrapper between a logic block and a through-silicon-via (TSV) as a fixed register so that the boundary register is not moved and logic or another register is not moved between the boundary register and the TSV;
    performing a timing analysis to determine if a timing target is satisfied or not satisfied;
    in response to a determination that the timing target is not satisfied, determining whether a complex logic gate is on a path having a most negative slack value during the timing analysis; and
    in response to a determination that the complex logic gate is on the path having the negative slack value, performing logic decomposition of the complex logic gate and performing the retiming process on a resulting structural circuit definition, wherein the timing analysis, retiming process, and logic decomposition are performed until the timing analysis determines that the timing target is satisfied or no complex logic gate is on the path having the most negative slack value.

16. The medium according to claim 15, wherein the retiming process is performed for a stack of dies of the 3D IC, wherein the timing target is a clock period of the stack.

17. The medium according to claim 16, in response to a determination that there is no complex logic gate on the path having the most negative slack value and the timing target is not satisfied, performing logic redistribution to shift logic between adjacent dies of the stack.

18. The medium according to claim 17, wherein performing the logic redistribution comprises:
identifying a logic cell closest to a TSV of a die with the path having the most negative slack value;
determining whether the logic cell is permitted to be moved to an adjacent die;
in response to a determination that the logic cell is permitted to be moved, moving the logic cell; and
in response to a determination that the logic cell is not permitted to be moved, keeping the logic cell in the die.

19. The medium according to claim 15, wherein the timing target is determined by:
identifying an amount of slack on a least-slack path of a selected die of a stack and incrementally reducing a target clock period until the least-slack path has no positive slack.

20. The medium according to claim 15, further comprising:
receiving a selection of a first die of the stack to omit from retiming;
inserting a dummy delay to a TSV path on a second die adjacent to the first die; and
performing the retiming process for the second die.

* * * * *